(12) United States Patent
Eshleman

(10) Patent No.: US 8,471,254 B2
(45) Date of Patent: Jun. 25, 2013

(54) LIQUID CRYSTAL CELLS WITH UNIFORM CELL GAP AND METHODS OF MANUFACTURE

(75) Inventor: Dean Eshleman, Streetsboro, OH (US)

(73) Assignee: Hana Microdisplay Technologies, Inc., Twinsburg, OH (US)

( * ) Notice: Subject to any disclaimer, the term of this patent is extended or adjusted under 35 U.S.C. 154(b) by 1737 days.

(21) Appl. No.: 11/319,808

(22) Filed: Dec. 27, 2005

(65) Prior Publication Data

US 2007/0158863 A1    Jul. 12, 2007

(51) Int. Cl.
*H01L 29/04* (2006.01)

(52) U.S. Cl.
USPC ............ 257/57; 257/59; 257/83; 257/290; 257/351; 257/368; 257/369; 257/E27.132; 257/E31.097; 349/155; 349/156; 349/158

(58) Field of Classification Search
USPC ............ 349/155, 156, 157, 158; 257/913, 257/57, 59, 83, 290, 351, 368, 369, E27.132, 257/E31.097
See application file for complete search history.

(56) References Cited

U.S. PATENT DOCUMENTS

| | | | |
|---|---|---|---|
| 4,050,786 A * | 9/1977 | Feldman | 349/155 |
| 5,231,257 A * | 7/1993 | Sasaki | 219/69.13 |
| 5,231,527 A * | 7/1993 | Takanashi et al. | 349/155 |
| 5,537,235 A * | 7/1996 | Ishihara et al. | 349/155 |
| 5,812,232 A * | 9/1998 | Shiroto et al. | 349/157 |
| 6,122,033 A * | 9/2000 | Mathew et al. | 349/155 |
| 6,767,795 B2 | 7/2004 | Ahn | |
| 6,812,100 B2 | 11/2004 | Ahn | |
| 6,844,203 B2 | 1/2005 | Ahn | |
| 6,852,167 B2 | 2/2005 | Ahn | |
| 6,930,346 B2 | 8/2005 | Ahn | |
| 6,953,730 B2 | 10/2005 | Ahn | |
| 7,048,824 B1 | 5/2006 | Werfel | |
| 2004/0021819 A1* | 2/2004 | Kadotani | 349/155 |
| 2005/0122464 A1* | 6/2005 | Lu | 349/190 |
| 2005/0128173 A1 | 6/2005 | Booh | |
| 2006/0082716 A1* | 4/2006 | Lebrun et al. | 349/153 |

* cited by examiner

*Primary Examiner* — Marc Armand
(74) *Attorney, Agent, or Firm* — Roetzel & Andress; Michael J. Keller

(57) ABSTRACT

A laminate structure and method of manufacture, such as a processed silicon wafer with an overlying layer or cover, includes a first layer or substrate which has a generally-planar region and a peripheral contoured region with falloff from a planar region of the first layer, and a second layer which overlies the first layer and is spaced from the planar region of the first layer a uniform distance by a plurality of uniform spacers, and peripheral spacers located in the peripheral contoured region which extend from the first layer to the second layer to maintain the second layer in the same plane as it extends over the falloff of the peripheral contoured region of the first layer to increase the useable area of the laminate structure. Spherical, deformable and fixed dimension spacers are used.

4 Claims, 1 Drawing Sheet

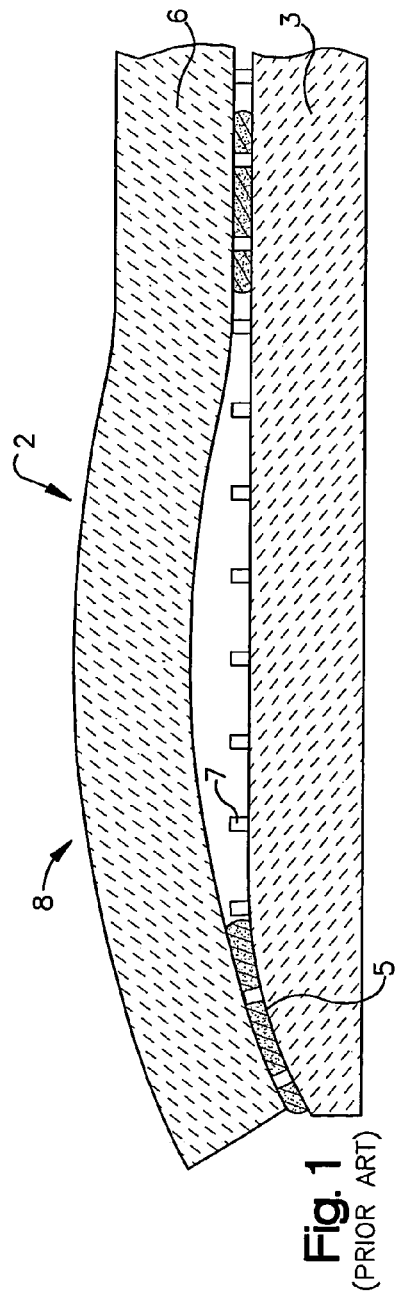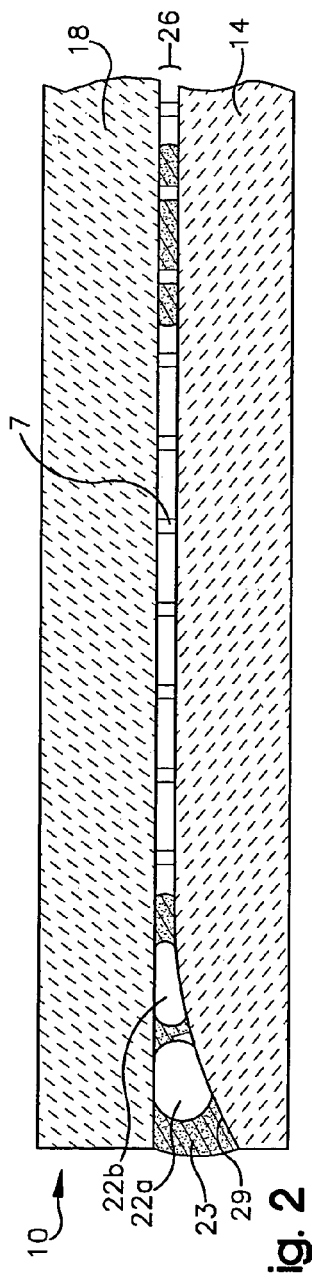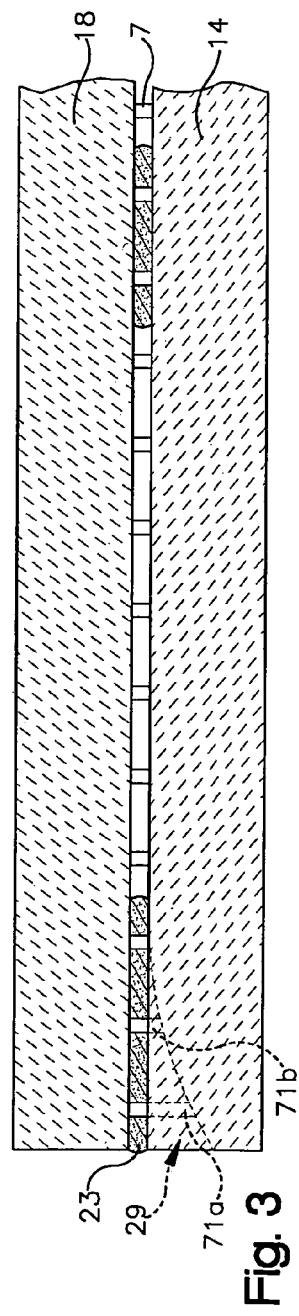

LIQUID CRYSTAL CELLS WITH UNIFORM CELL GAP AND METHODS OF MANUFACTURE

FIELD OF THE INVENTION

The invention relates generally to liquid crystal cells and devices and methods for manufacture.

BACKGROUND OF THE INVENTION

Liquid crystal cells have a substrate and glass cover which is spaced from the substrate, thus forming a cell gap and chamber which holds liquid crystal material. Assembly of the cell requires structure for spacing and attachment of the cover relative to the substrate. Spacers are positioned between the two layers, either within or outside of a gasket area which encircles each cell chamber. When manufactured in wafer-scale, the layers of the laminate structure are separated by spacers disposed periodically between the layers, and between the cells and at the perimeters of the wafers. Once the proper separation, i.e. cell gap, between the wafers has been established, the wafers are attached together via conventional wafer bonding or adhesive techniques, but only in selected areas between the layers. This results in concentration of stresses in unbonded areas, e.g. within the cell, and non-uniform cell gap.

Mechanical strain from bonding a glass layer to a semiconductor wafer can result in falloff at the perimeter of the wafer, rendering the dies at the edge of the wafer unusable. Undulations in the semiconductor substrate also contribute to non-uniformity of the laminate spacing. The degree of falloff exhibited by each substrate varies depending upon the manufacturing and processing operations and conditions. For example, planarizing techniques use to fabricate the semiconductor wafers often include a mechanical polishing step that can result in significant falloff near the edge of the wafer. A planar glass substrate will not be able to conform to the underlying falloff contour at the edge of the semiconductor substrate due to the rigidity of the glass substrate. Sloped falloff at the periphery of the wafer will result in bonding stresses that make the gap between the two substrates for devices at the edges of the wafer non-uniform. The result is that die which include a portion of the semiconductor substrate exhibiting falloff will not have an intact glass substrate coupled to the semiconductor substrate and will not have uniform spacing between the attached layers. The underlying semiconductor substrate is not sufficiently coupled to the glass layer by the seal therebetween due to the divergence of the semiconductor substrate from the planar glass. The distance between the glass layer and semiconductor substrate at a particular location can be measured with a profilometer, and the falloff distance and shape modeled by triangulation, it is still trial and error to determine the proper spacing size to accommodate these dimensional inconsistencies. Even where uniform spacing is achieved through the central region of the wafer, die which are contiguous with the edge falloff portions of the semiconductor substrate have been discarded, drastically reducing the yield of the wafer.

FIG. 1 illustrates a prior art example of a laminate 2 formed with layers 3 and 6 and spacers 7 therebetween. The bottom layer 3 or substrate has dimensional variances, i.e. "falloff" in a peripheral region 5 as illustrated. Because of the falloff in the peripheral region 5 of the substrate 3, attaching the overlying layer 6 to the substrate 3, separated by uniformly-sized spacers 7 produces bulging or dimensional variance, generally indicated at 8, in the layer 6 as shown which results in non-uniform spacing of the two layers, and thus producing a non-uniform gap between the layers (also referred to as "cell gap" in the case of liquid crystal devices) and an area of the laminate which does not yield workable device dies. This substantially reduces the yield of a wafer substrate which, in the case of processed silicon as the substrate, is a substantial economic loss. The distortion of the upper layer 6 is caused by the falloff in the peripheral region 5 and the use of commonly sized spacers 7 between the layers all the way to the peripheral edge of the layers. When adhesively bonded, the upper layer 6 is drawn down into the falloff peripheral region of the substrate or lower layer 3 which causes the bulge or other distortion of the upper layer 6. Where the bulging or distortion of layer 6 extends beyond the falloff peripheral region 5, a substantial area of the laminate structure is rendered useless for purposes of devices which require a uniform spacing or cell gap between the layers, such as liquid crystal devices.

SUMMARY OF THE INVENTION

It is an objective of the invention to make the device cell gap uniform in the functional areas of a laminated wafer structure, and to thereby maximize the device yield of a wafer including regions near the periphery of the wafer. The invention achieves these and other objectives by providing a laminate with a plurality of spacers having different dimensions are disposed between the first and second substrates to establish a uniform separation between the first and second substrates, particularly at the perimeters of the wafer.

In accordance with another aspect, the present invention also provides a method of fabricating a laminate having a generally-planar surface independent of the contour or surface of an underlying substrate. The method comprises the steps of arranging a first substrate relative to a second substrate such that the second substrate opposes both a contoured region and a planar region of the first substrate, providing a first spacer between the planar region of the first substrate and the second substrate to establish a desired separation between the planar region of the first substrate and the second substrate, and providing a second spacer between the arcuate region of the first substrate and the second substrate to establish a desired separation between the arcuate region of the first substrate and the second substrate that is different than the separation between the planar region of the first substrate and the second substrate.

BRIEF DESCRIPTION OF THE DRAWINGS

FIG. 1 is an illustration of a portion of a prior art laminate exhibiting non-uniform spacing of the laminate layers and falloff in a peripheral region of the wafer;

FIG. 2 is a side view of a laminate structure of the invention, and

FIG. 3 is a top view of a conventional laminate showing the extent to which an arcuate region affects the useful area of the laminate.

DETAILED DESCRIPTIONS OF PREFERRED AND ALTERNATE EMBODIMENTS

FIG. 2 illustrates a side view of a laminate 10 of the present invention. As shown, the laminate 10 includes a base substrate layer 14 separated from a second layer 18 by a plurality of spacers 7 between planar regions of the layers, and peripheral spacers 22a and 22b at the periphery of the wafers. In one embodiment of the invention, the peripheral spacers are in the form of plastic spheres which are mixed with an epoxy adhesive or sealant which forms a peripheral seal about the periphery of the laminate 10. The spheres which form the peripheral spacers 22 are deformable, and fill the distance between the layers 14, 18 at the periphery of the wafers. Spacers 7 are also referred to herein as "primary spacers" and spacers 22 as "secondary spacers".

The layers 14, 18 may be any suitable material used in the manufacture of electronic circuitry including materials used in liquid-crystal cells such as silicon, conductive and insulating layers and transparent layers such as glass. Examples of materials include silicon, a combination of silicon and one or more other materials, glass, metals, metal alloys, and the like. The base layer 14 has a rounded or non-planar region 29 about the perimeter as a result of fabrication of the layer, e.g. by vapor deposition and/or processing such as machine polishing. However, the shape and nature of the particular contours can be other than non-planar or curved or undulated, such as steps with different elevations.

To form the laminate 10, layer 18 is positioned adjacent to layer 14 and separated a predetermined distance by spacers 7 to establish the desired cell gap 26. The uniform cell gap dimension is determined by spacers 7 placed between planar regions of the layers. Layer 18 is attached to layer 14 by an adhesive. Layer 18 is positioned and held at the uniform cell gap 26 by spacers 7 and peripheral spacers 22a, 22b, without any distortion caused by bonding of the layers at the non-planar region 29. This is achieved by the spacers 22 which have a vertical dimension which is greater than a vertical dimension of spacers 7 to account for the difference in the gap between the layers at the contoured peripheral region. Therefore, the device dies which are closest to the periphery of the wafer, i.e., closest to spacers 22, are not ruined by any deformation of layer 18 as a result of attachment to the peripheral (non-planar) region 29 of layer 14.

FIG. 3 illustrates an alternate embodiment of a laminate 10 wherein layers 14 and 18 are parallel and separated a uniform distance (cell gap) by spacers 7. In the peripheral region 29 where some falloff may be present spacers 71a, 71b of additional height are provided to support the layer 18 in a planar configuration above layer 14. The additional height of spacers 71a, 71b can be determined by measurement of the amount of falloff relative to the overlying layer 18. The spacers 71a, 71b can be cut to exact dimensions or have some ability to compress to the parallel position of layer 18. Although shown with two peripheral spacers 71a, 71b, additional peripheral spacers with a height dimension greater than spacers 7 can be provided in the peripheral region 29 of the laminate 10. Peripheral sealant 23 is applied between the layers in the peripheral region 29.

What is claimed is:

1. A laminate structure comprising:
    a first layer having a planar region and a peripheral contoured region;
    a planar second layer parallel to and spaced from the first layer and overlying the generally planar region and the peripheral contoured region of the first layer; and
    a plurality of uniform spacers positioned between the first and second layers and spacing the second layer a uniform distance from the planar region of the first layer, and one or more peripheral spacers positioned between the first and second layers in the peripheral contoured region, the peripheral spacers extending between the peripheral contoured region of the first layer and the planar second layer, the peripheral spacers having a vertical dimension greater than a vertical dimension of the uniform spacers; wherein the peripheral spacers are deformable adhesive between the first and second layers in the peripheral contoured region;
    the planar second layer lying entirely in a single, plane spaced from the planar region and the peripheral contoured region of the first layer.

2. The laminate structure of claim 1 wherein the first layer is a wafer.

3. The laminate structure of claim 1 wherein the first and second layers are generally circular, and the peripheral contoured region of the first layer is at the periphery of the circular first layer.

4. The laminate structure of claim 1 wherein the uniform spacers and the peripheral spacers are generally spherical.

\* \* \* \* \*